(12) United States Patent
Caillot

(10) Patent No.: US 10,688,969 B2
(45) Date of Patent: Jun. 23, 2020

(54) YOKE FOR A DRIVE ARM OF A WINDSCREEN WIPER

(71) Applicant: Valeo Systèmes d'Essuyage, Le Mesnil Saint Denis (FR)

(72) Inventor: Gérald Caillot, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 7 days.

(21) Appl. No.: 15/560,509

(22) PCT Filed: Mar. 14, 2016

(86) PCT No.: PCT/EP2016/055411
§ 371 (c)(1),
(2) Date: Jan. 10, 2018

(87) PCT Pub. No.: WO2016/150739
PCT Pub. Date: Sep. 29, 2016

(65) Prior Publication Data
US 2018/0126959 A1    May 10, 2018

(30) Foreign Application Priority Data
Mar. 24, 2015  (FR) ..................... 15 52422

(51) Int. Cl.
*B60S 1/40* (2006.01)
*B60S 1/34* (2006.01)
*B60S 1/38* (2006.01)

(52) U.S. Cl.
CPC ........... *B60S 1/4048* (2013.01); *B60S 1/3429* (2013.01); *B60S 1/3849* (2013.01); *B60S 1/4038* (2013.01); *B60S 1/3447* (2013.01)

(58) Field of Classification Search
CPC ........ B60S 1/32; B60S 1/3425; B60S 1/3427; B60S 1/3447; B60S 1/4038; B60S 1/4041; B60S 1/4048; B60S 1/4064; B60S 1/3429
(Continued)

(56) References Cited

U.S. PATENT DOCUMENTS 1,662,244 A * 3/1928 Folberth ............... B60S 1/3427
                                                      15/250.34
2,376,012 A * 5/1945 Sacchini ............... B60S 1/3404
                                                      15/250.202
(Continued)

FOREIGN PATENT DOCUMENTS

CN     1404450 A     3/2003
CN     101111415 A   1/2008
(Continued)

OTHER PUBLICATIONS

International Search Report of the International Searching Authority issued in PCT/EP2016/055411 dated Jun. 6, 2016 (2 pages).
(Continued)

*Primary Examiner* — Gary K. Graham
(74) *Attorney, Agent, or Firm* — Osha Liang LLP

(57) ABSTRACT

Yoke (14*a*') for drive arm (14') of a wiper (12) of a windscreen wiper system (10') of a vehicle, in particular a motor vehicle, said yoke including:
a connecting part (30') of elongate general shape and including an interior longitudinal end (30*a*') intended to be connected to a drive means of the arm and an exterior longitudinal end (30*b*'),
a terminal part (28') of the arm forming a yoke for fixing it to said wiper, said terminal part having an elongate general shape and including an exterior longitudinal end (28*b*'') and an interior longitudinal end (28*a*') that is intended to be situated on the side of said drive means,
(Continued)

Fig. 3 characterized in that the exterior longitudinal end (30b') of said connecting part (30') is connected to said terminal part (28') in a zone (C) that is longitudinally spaced from said interior longitudinal end (28a') of the terminal part (28').

16 Claims, 3 Drawing Sheets

(58) Field of Classification Search
USPC .......................... 15/250.32, 250.23, 250.351
See application file for complete search history.

(56) References Cited

U.S. PATENT DOCUMENTS

| | | | | |
|---|---|---|---|---|
| 2,607,944 | A * | 8/1952 | Turner | ................... B60S 1/28 |
| | | | | 15/250.04 |
| 2,913,754 | A * | 11/1959 | Vander Zee | ......... B60R 1/0602 |
| | | | | 15/250.003 |
| 5,987,695 | A * | 11/1999 | Edele | .................... B60S 1/3404 |
| | | | | 15/250.04 |
| 2009/0307862 | A1 * | 12/2009 | Boland | ................ B60S 1/3806 |
| | | | | 15/250.32 |

FOREIGN PATENT DOCUMENTS

| | | | |
|---|---|---|---|
| CN | 103183011 | A | 7/2013 |
| EP | 1436177 | | 7/2004 |
| EP | 2460700 | A1 | 6/2012 |
| EP | 2803542 | A1 | 11/2014 |
| EP | 2803544 | A2 | 11/2014 |
| EP | 2821297 | * | 1/2015 |
| FR | 2964620 | * | 3/2012 |
| JP | 4-193651 | * | 7/1992 |
| JP | 2015-037930 | A | 2/2015 |
| WO | 03/035439 | A1 | 5/2003 |

OTHER PUBLICATIONS

Written Opinion of the International Searching Authority issued in PCT/EP2016/055411 dated Jun. 6, 2016 (5 pages).

First Office Action in corresponding Chinese Application No. 201680025943.7, dated Jul. 25, 2019 (13 pages).

The Second Office Action issued in corresponding Chinese Patent Application No. 201680025943.7, dated Apr. 10, 2020 (11 pages).

* cited by examiner

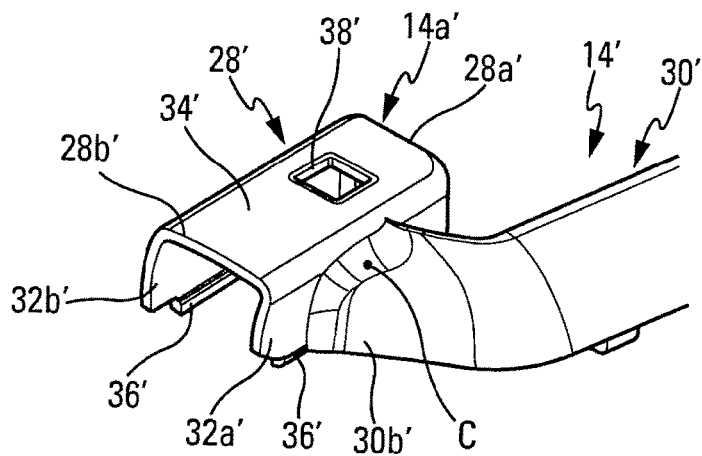
Fig. 4
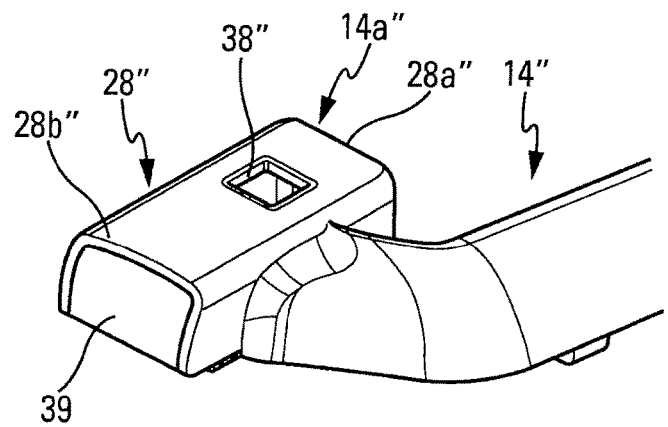
Fig. 5
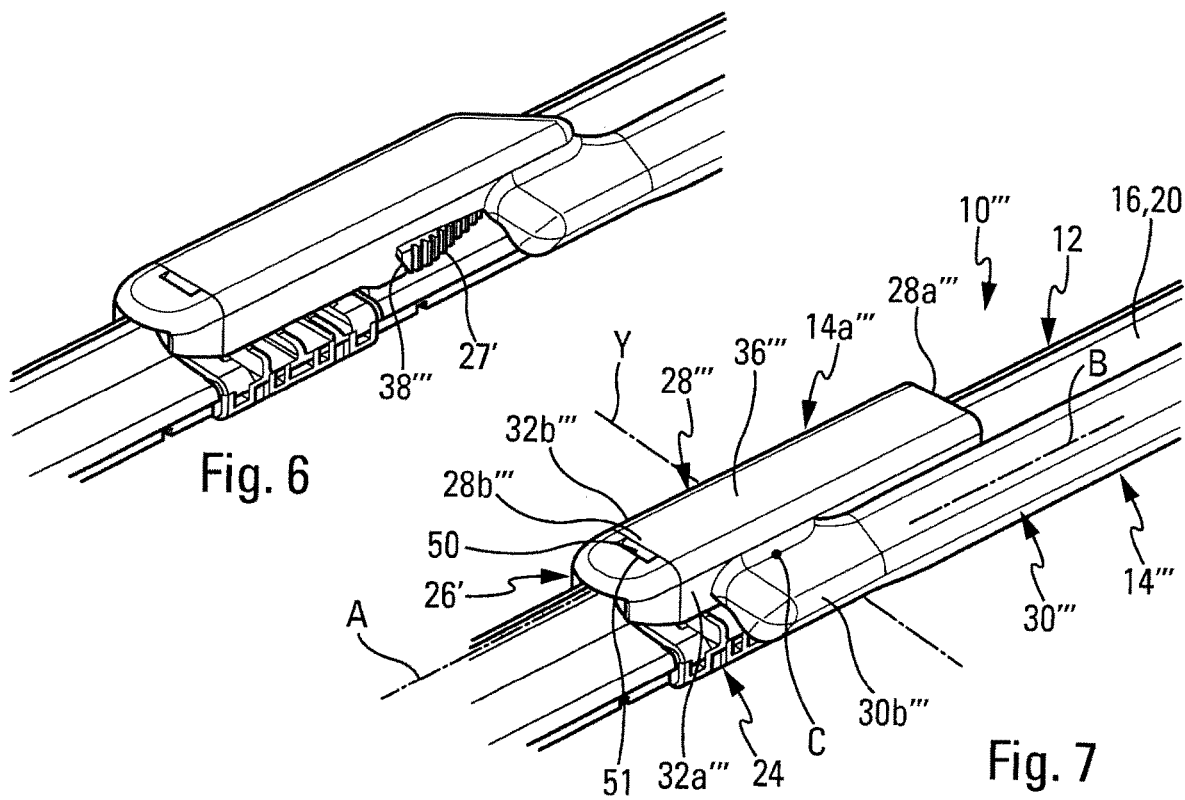
Fig. 6
Fig. 7

YOKE FOR A DRIVE ARM OF A WINDSCREEN WIPER

TECHNICAL FIELD

The present invention concerns an arm with a yoke for driving a windscreen wiper of a vehicle, in particular a motor vehicle.

PRIOR ART

A motor vehicle is conventionally equipped with windscreen wipers for washing the windscreen and preventing the driver's view of their environment from being interfered with. These windscreen wipers generally comprise a drive arm effecting an angular to-and-fro movement and elongate windscreen wipers carrying wiper blades made from an elastic material. These blades rub against the windscreen and evacuate water to remove it from the field of view of the driver. The windscreen wipers are made either, in a standard version, in the form of articulated stirrups that hold the wiper blade at a plurality of discrete locations and confer on it a curvature enabling it to espouse any curvature of the windscreen or, in a more recent "flat blade" version, in the form of a semi-rigid assembly that holds the wiper blade over all its length by means of one or more vertebrae imparting a curvature enabling application of the windscreen wiper to the windscreen without it being necessary to use stirrups.

In both solutions, the windscreen wiper is attached to the drive arm by a connection system including a connector and an adapter. The connector is a part that is fixed directly to the wiper blade or directly to the flat blade and the adapter is an intermediate part enabling connection and fixing of the connector to the drive arm. These two parts are connected to each other by a transverse articulation shaft that allows their relative rotation in a plane perpendicular to the windscreen and passing through the arm. The adapter is moreover configured to be engaged in a head or terminal part of the drive arm in the form of a yoke.

An arm with a yoke typically comprises a connecting part of elongate general shape including an interior longitudinal end intended to be connected to a drive means of the arm, such as an electric motor, via a drive member for example, and an exterior longitudinal end connected to the terminal part forming the yoke for fixing it to the windscreen wiper. The terminal part has an elongate general shape and includes an exterior longitudinal end and an interior longitudinal end that is intended to be situated on the side of the drive means.

In the current state of the art, the exterior longitudinal end of the connecting part is connected to the interior longitudinal end of the terminal part. In other words, the terminal part extends longitudinally outward in line with the connecting part. This configuration has disadvantages, in particular where the aerodynamics of the arm are concerned.

In the case of a windscreen wiper situated on the driver side of the vehicle, for example, the windscreen wiper receives in operation a flow of air that is substantially perpendicular to the longitudinal direction of the windscreen wiper. The flow of air flows over the windscreen wiper, which generally comprises a spoiler reinforcing the pressing of the windscreen wiper against the windscreen. The exterior end portion of the connecting part of the arm that is connected to the terminal part impedes the passage of the flow of air in this zone and generates disturbances in this flow of air, even if the arm has a profile intended to limit these disturbances. It has been found that this end portion generates a level of lift of the arm such that it is raised when the windscreen wiper in operation and there is therefore a loss of efficacy of the wiping of the windscreen.

The present invention proposes a simple, effective and economic solution to this problem.

SUMMARY OF THE INVENTION

The present invention concerns a yoke for drive arm of a windscreen wiper of a vehicle, in particular a motor vehicle, said yoke including:
a connecting part of elongate general shape and including an interior longitudinal end intended to be connected to a drive means of the arm and an exterior longitudinal end,
a terminal part of elongate general shape and including an exterior longitudinal end and an interior longitudinal end that is intended to be situated on the side of said drive means,
characterized in that the exterior longitudinal end of said connecting part is connected to said terminal part, in a zone that is longitudinally spaced from said interior longitudinal end of the terminal part.

The zone of connection of the part to the terminal part is therefore offset longitudinally outward compared to the prior art, which can make it possible to limit the disturbances of the flow of air referred to above. It can further make it possible to reduce the longitudinal dimension of the terminal part and thus to limit its influence on the disturbances of the flow of air. It can finally make it possible to improve the arm-windscreen wiper interaction in this zone and to reduce the lift in this zone.

The arm according to the invention may have one or more of the following features, separately or in combination:
said zone is substantially at the middle, on an exterior half, on an exterior quarter or at the exterior end of the terminal part with reference to the longitudinal direction of that part,
said zone is longitudinally spaced from said exterior longitudinal end of the terminal part,
the terminal part comprises two longitudinal lateral walls the longitudinal upper edges of which are interconnected by a transverse upper wall, said zone being situated on one of said longitudinal lateral walls,
said longitudinal lateral walls define between them a housing configured to receive at least a part of a system for connection of the arm to said windscreen wiper,
said housing opens longitudinally onto the interior longitudinal end or the exterior longitudinal end of the terminal part,
said housing is closed at the exterior longitudinal end or at the interior longitudinal end of the terminal part, notably by an exterior wall connecting exterior edges of said transverse upper and longitudinal lateral walls,
said connecting part comprises an exterior end portion connected to said terminal part and in which that exterior end portion is situated substantially below a plane in which said upper wall of the terminal part extends,
said exterior end portion has a curved general shape or an L-shape,
said terminal part comprises at least one orifice configured to receive, for example by elastic clipping, a pushbutton of a system for connection of the arm to said windscreen wiper,
said at least one orifice is an upper orifice or situated on an upper wall of the terminal part,
said at least one orifice is a lateral orifice or situated on a lateral wall of the terminal part, said at least one orifice is notably situated substantially in line with said zone or is longitudinally offset toward the interior of said zone, said terminal part comprises at least one lateral notch configured to cooperate, for example by elastic clipping, with an engagement portion of a system for connection of the arm to said windscreen wiper, said terminal part comprises at least one exterior hook or finger configured to be engaged in a housing of a system for connection of the arm to said windscreen wiper, and the yoke is made in one piece with a rod and a casing, for example formed by pressing, welding plates or by moulding.

The present invention also concerns an arm including a yoke as described above.

The present invention further concerns an assembly including an arm as described above and a system for connection of said arm to a windscreen wiper, the connection system notably including two members articulated to each other about an articulation axis, in which said articulation axis is situated substantially in line with said zone or is longitudinally offset toward the interior of said zone.

The present invention further concerns a windscreen wiper of a vehicle, in particular a motor vehicle, including a wiper and an arm as described above.

DESCRIPTION OF THE FIGURES

The invention will be better understood and other details, features and advantages of the invention will become apparent on reading the following description given by way of nonlimiting example and with reference to the appended drawings, in which:

FIG. 4 is a diagrammatic perspective view to a larger scale of the yoke of the arm of the windscreen wiper from FIG. 3, FIG. 5 is a view corresponding to that of FIG. 4 and showing a variant embodiment of the yoke of the arm according to the invention, FIG. 6 is a diagrammatic perspective view of part of a prior art windscreen wiper, FIG. 7 is a diagrammatic perspective view of part of a windscreen wiper according to the invention.

DETAILED DESCRIPTION

It should be noted that the figures show the invention in detail for use of the invention, said figures being of course usable to define the invention better if necessary.

In the following description, the terms longitudinal and lateral refer to the orientation of the windscreen wiper or the drive arm. The longitudinal direction corresponds to the main axis of the windscreen wiper or the arm along which it extends while the lateral orientations correspond to straight line segments that are concurrent, i.e. that cross the longitudinal direction, notably perpendicularly to the longitudinal direction of the windscreen wiper or of the arm in its plane of rotation. For the longitudinal directions, the terms exterior and interior are referred to the point of fixing of the windscreen wiper to the arm, the term interior in relation to the point of fixing of the arm to the vehicle notably corresponding to a part where the arm and one half of the windscreen wiper extend. The directions referred to as upper or lower correspond to orientations perpendicular to the plane of rotation of the windscreen wiper, the term lower containing the plane of the windscreen. Finally, the term horizontal refers to something or a direction substantially parallel to the windscreen and the term vertical refers to something or a direction substantially perpendicular to the windscreen.

Figure 1:
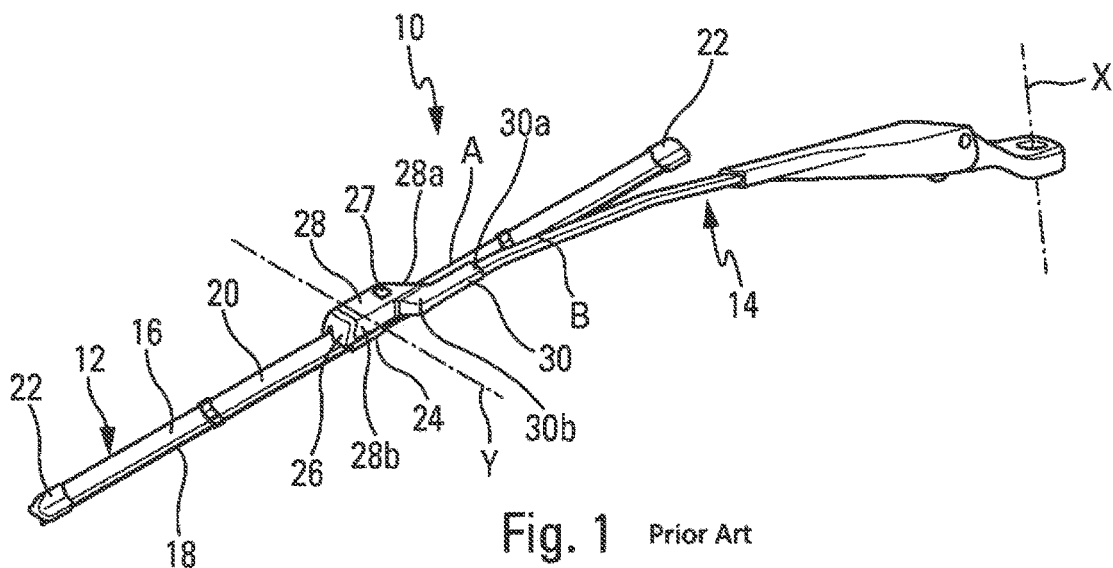
FIG. 1 is a diagrammatic perspective view of a prior art windscreen wiper.

FIG. 1 shows a windscreen wiper 10 notably including a wiper 12 and a drive arm 14 of the wiper 12.

The wiper 12 is preferably of the flat blade type and comprises a longitudinal body 16, a wiper blade 18, generally made of rubber, and at least one vertebra (not visible) that stiffens the blade and encourages its application to a vehicle windscreen.

The body 16 of the wiper 12 can include an upper spoiler 20 intended to improve the operation of the wiper system, the aim being for this spoiler to reinforce the pressing of the windscreen wiper onto the windscreen and therefore improve the aerodynamics of the windscreen wiper.

The wiper 12 can further comprise end-pieces 22 or clips attaching the blade 18 and the vertebra(e) to the body 16, these end-pieces 22 being situated at each of the longitudinal ends of the body 16.

The wiper 12 comprises substantially in the middle an intermediate connector 24. An adapter 26 fastened to the arm 14 is mounted on the connector 24 in such a manner as to preserve a degree of freedom in pivoting about a transverse articulation axis Y substantially perpendicular to the longitudinal axis of the wiper 12. This degree of freedom allows pivoting of the wiper 12 relative to the arm 14 and therefore allows the windscreen wiper to follow the curvature of the windscreen as it moves. The adapter 26 can be unfastened from the arm 14 by depressing a pushbutton 27 carried by the adapter.

The arm 14 is intended to be driven by an electric motor about a shaft with an angular to-and-fro movement making it possible to evacuate water and possibly other unwanted elements covering the windscreen. The adapter 26 connects the wiper 12 to the arm 14 and in particular to a yoke 14a of the arm which can be made in one piece with the arm or mounted on and fixed to the latter.

The yoke 14a comprises a terminal part 28 and a connecting part 30 that are connected together.

Figure 2:
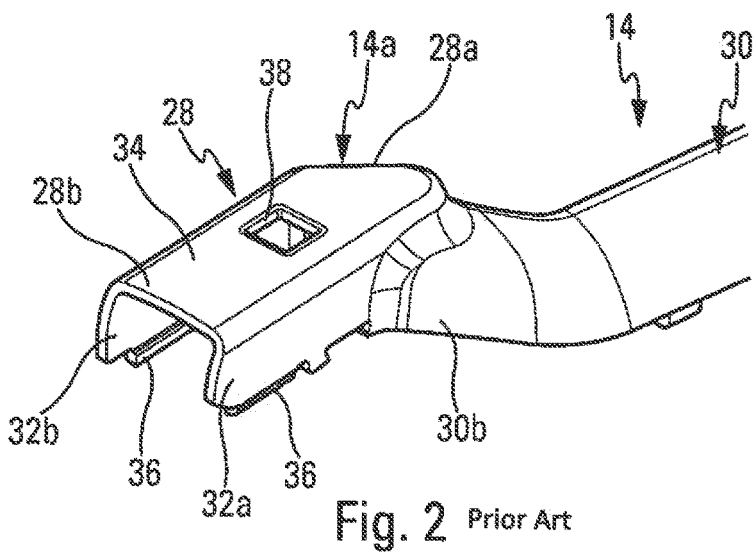
FIG. 2 is a diagrammatic perspective view to a larger scale of the terminal part of the drive arm of the windscreen wiper from FIG. 1.

The terminal part 28, seen better in FIG. 2, is substantially U-shaped in cross section.

The terminal part 28 has an elongate shape the lengthwise axis A of which is generally substantially parallel to the lengthwise or longitudinal axis of the wiper 12.

The connecting part 30 connects the yoke 14a to the rest of the arm 14, for example by crimping it thereto. This connecting part 30 has an elongate general shape and extends along an axis B substantially parallel to the axis A and at a distance from that axis, as can be seen in FIGS. 1 and 2. The connecting part 30 is connected to a rear or interior end of the rest of the arm.

The interior longitudinal end 30a of the connecting part 30 of the arm is defined as being the longitudinal end of that part oriented on the side of the electric motor or the rotation axis X. The exterior longitudinal end 30b of the connecting part 30 is defined as being the opposite longitudinal end of this part. Similarly, the interior longitudinal end 28a of the terminal part 28 of the arm is defined as being the longitudinal end of that part oriented on the side of the motor and its exterior longitudinal end 28b is defined as being the opposite longitudinal end of that part. These definitions are valid for all the windscreen wipers described in the present application.

The terminal part 28 comprises two longitudinal lateral walls 32a, 32b the longitudinal upper edges of which are connected to one another by a transverse upper wall 34. The walls 32a, 32b, 34 delimit between them a housing to receive the adapter 26. The walls 32a, 32b comprise at the level of their longitudinal lower edges means 36, such as hooks, for retaining the adapter 26 in the aforementioned housing. That housing is open at the level of the exterior longitudinal end of the terminal part 28 and, although this cannot be seen in the drawings, is closed at the level of the interior longitudinal end of the terminal part 28.

The upper wall 34 comprises an orifice 38 through it of complementary shape to a pushbutton 27. In the mounted position, the pushbutton 27 is accommodated in this orifice 38 and able to pass through the latter so as to project on the upper face of the wall 34. The pushbutton 27 is mounted in the orifice 38 by simple engagement or nesting therein.

As seen in FIG. 2, the exterior end 30b of the connecting part 30 is connected to the lower end 28a of the terminal part 28, which leads to the aerodynamic disturbances when the windscreen wiper is used referred to above.

Figure 3:
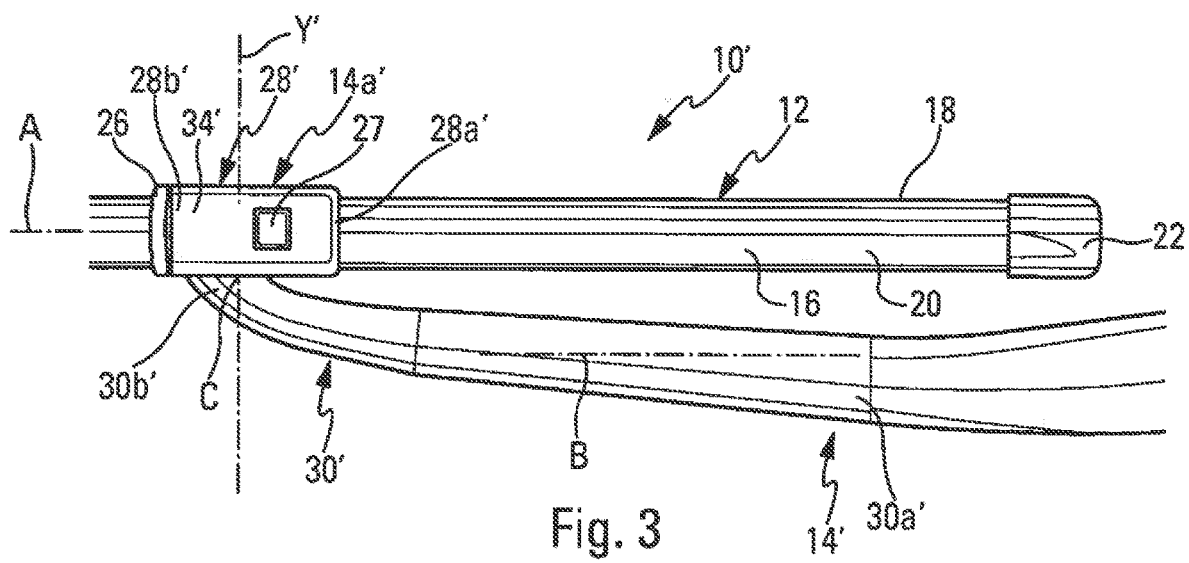
FIG. 3 is a diagrammatic perspective view of part of a windscreen wiper according to the invention.

According to the present invention, the exterior longitudinal end 30b of the connecting part 30 of the arm is connected to the terminal part 28 in a zone that is longitudinally spaced from the interior longitudinal end 30a of the terminal part. FIGS. 3 and 4 show a first embodiment of the invention in which the elements already described above are designated by the same references.

FIG. 3 shows a windscreen wiper 10' the wiper 12 of which can be similar to that described above in relation to FIG. 1.

The arm 14' shown in FIGS. 3 and 4 comprises a terminal part 28' and a connecting part 30'. The terminal part 28' forms a yoke 14a' with a substantially U-shaped cross section.

The terminal part 28' has an elongate shape the lengthwise axis A of which is generally substantially parallel to the lengthwise or longitudinal axis of the wiper 12. The connecting part 30' enables connection of the terminal part 28' to the rest of the arm 14', for example by crimping. It may also be a "styling feature" that directly comprises the part 28' and the part 30'. This connecting part 30' has an elongate general shape and extends along an axis B substantially parallel to the axis A and at a distance from that axis. The connecting part 30' is connected to a rear or interior end of the rest of the arm.

The terminal part 28' comprises two longitudinal lateral walls 32a', 32b' the longitudinal upper edges of which are connected to one another by a transverse upper wall 34'. The walls 32a', 32b', 34' delimit between them the housing to receive the adapter 26. The walls 32a', 32b' comprise at the level of their longitudinal lower edges means 36', such as hooks, for retaining the adapter 26' in the aforementioned housing. That housing is open at the exterior longitudinal end of the terminal part 28' and preferably also at its interior longitudinal end.

The upper wall 34' comprises an orifice 38' through it of complementary shape to the pushbutton 27. In the mounted position, the pushbutton 27 is accommodated in this orifice 38' and can pass through the latter so as to project on the upper face of the wall 34'. The pushbutton 27 is mounted in the orifice 38' by simple engagement or nesting therein.

As seen in FIGS. 3 and 4, the exterior end 30b' of the connecting part 30' is connected to the terminal part 28' in a zone C that is longitudinally offset from the interior end 28a' of the terminal part 28'.

In the example shown, the zone C is also offset longitudinally from the exterior end 28b' of the terminal part 28'.

In the example shown, this zone C is situated on one of the lateral walls 32a' of the terminal part 28'. In other words, the connecting part 30' is connected to the terminal part 28' by its lateral wall 32a' and here substantially in the middle of that lateral wall (in the longitudinal direction). It could be connected to the exterior half of the lateral wall 32a', to the exterior quarter of the lateral wall 32a', or even to the exterior end of that wall.

Moreover, as can be seen in FIG. 4, the exterior end 30b' of the connecting part 30' is situated substantially below the plane of the upper wall 34' of the terminal part 28'.

Here the exterior end portion has a curved shape, its concave side facing toward the interior of the wiper system.

The orifice 38' is substantially offset longitudinally inward, as can be seen better in FIG. 3. It is moreover seen in that figure that the articulation axis Y is situated substantially in line with the zone C.

Here, in one particular embodiment of the invention, the connecting part 30' and the terminal part 28' are formed in one piece, for example by pressing and welding plates. As stated above, other embodiments can be envisaged in this regard.

The invention therefore makes it possible for the zone C to be as close as possible to the exterior end of the lateral wall 32a', preferably to create a spoiler shape over all of the length of the terminal part 28 and to avoid the vertical "flat" consisting of the vertical wall 32a of the yoke 14a from FIG. 2, which penalizes the aerodynamic performance of the arm (because it forms a wall facing the flow of air when operating). It further makes it possible to reduce the disturbance of this flow of air at the level of the connection of the lower part of the wiper with the central connection, because of the presence of the end 30b', which will tend to shelter the wiper from this flow of air.

The wiper can be mounted on the arm 14' in the following manner. The terminal part 28' is disposed on the adapter 26 of the system for connection to the wiper 12 and is inclined relative to this adapter so that the exterior longitudinal end 28b' of the terminal part 28' is the closest to the adapter and cooperates first with the adapter. The interior longitudinal end 28a' of the terminal part is then bent over the adapter to complete the connection and to lead to the engagement of the pushbutton in the orifice 38' by elastic clipping. The adapter 26 comprises a part termed the head or cap that may be situated in front of or outside the terminal part 28'.

Alternatively, the wiper 12 can be mounted by movement in longitudinal translation of the adapter 26 in the terminal part 28' of the arm, from the outside toward the inside.

The FIG. 5 variant embodiment differs from the embodiment of FIGS. 3 and 4 essentially in that the housing of the terminal part 28" of the arm 14" is closed at the level of its exterior longitudinal end 28b". Conversely, its interior longitudinal end 28a" is preferably open, in particular to facilitate or allow the mounting of the adapter in the housing. The terminal part 28" forms with a connecting part 30" a yoke 14a" of the arm 14".

The wiper can be mounted on the arm 14" in the following manner. The terminal part 28" is disposed on the adapter of the system for connection to the wiper 12 and is inclined relative to that adapter so that the interior longitudinal end 28a" of the terminal part 28" is closest to the adapter and cooperates first with the adapter. The exterior longitudinal end 28b″ of the terminal part is then bent over the adapter to complete the connection and to lead to the engagement of the pushbutton in the orifice 38″ by elastic clipping. The exterior transverse wall 39 then extends in front of or outside the adapter.

Alternatively, the wiper 12 can be mounted by movement in longitudinal translation of the adapter in the terminal part 28″ of the arm, from the inside toward the outside.

Figure 8:
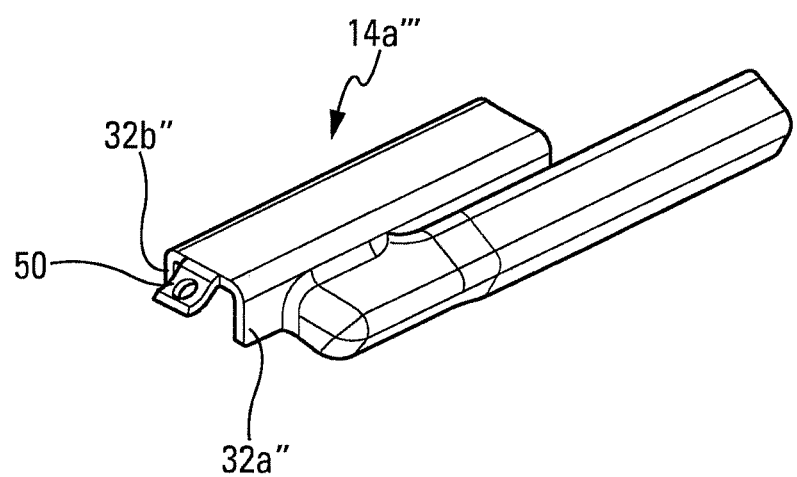
FIG. 8 is a diagrammatic perspective view of part of the yoke of the windscreen wiper from FIG. 7.

FIGS. 7 and 8 show another variant embodiment of the invention to be compared with the prior art shown in FIG. 6.

FIG. 7 shows a windscreen wiper 10‴ the wiper 12 of which can be similar to that described above in relation to FIG. 1.

The arm 14‴ comprises a yoke 14a‴ including a terminal part 28‴ and a connecting part 30‴. The yoke 14a‴ is substantially U-shaped in cross section.

The terminal part 28‴ has an elongate shape the lengthwise axis A of which is generally substantially parallel to the lengthwise or longitudinal axis of the wiper 12. The connecting part 30‴ enables connection, for example crimping, of the terminal part 28‴ to the rest of the arm 14‴.

This connecting part 30‴ has an elongate general shape. It extends along an axis B substantially parallel to the axis A and at a distance from that axis.

The connecting part 30‴ connects the terminal part 28‴ to a rear or interior end of the arm intended to be connected to a drive means of the arm.

The terminal part 28‴ comprises two longitudinal lateral walls 32a‴, 32b‴ the longitudinal upper edges of which are connected to one another by another transverse wall 34‴. The walls 32a‴, 32b‴, 34‴ delimit between them a housing to receive the adapter 26′. The walls 32a‴, 32b‴ comprise at the level of their longitudinal lower edges means, such as hooks, for retaining the adapter 26′ in the aforementioned housing. That housing is open at the level of the exterior longitudinal end of the terminal part 28‴ and preferably also at the level of its interior longitudinal end.

The exterior end 30b‴ of the connecting part 30‴ is connected to the terminal part 28‴ in a zone C that is longitudinally spaced from the interior end 28a‴ of the terminal part 28‴. In the example shown, the zone C is also longitudinally spaced from the exterior end 28b‴ of the terminal part 28‴.

In the example shown, this zone C is situated on one of the lateral walls 32a‴ of the terminal part 28‴. In other words, the connecting part 30‴ is connected to the terminal part 28‴ by its lateral wall 32a‴ and here substantially in the vicinity of the end 28b‴ of that lateral wall (in the longitudinal direction). Here the connecting part 30″ is connected to the middle of this lateral wall 32a‴ (in the longitudinal direction). It could be connected to the exterior half of the lateral wall 32a′, to the exterior quarter of the lateral wall 32a′, or even to the exterior end of that wall. As previously indicated, the aim is for the zone C to be as close as possible to the exterior end of the lateral wall 32a′ to create a spoiler shape over all the length of the terminal part 28′ and to avoid the flat consisting of the lateral wall 32a of the prior art yoke that penalizes the aerodynamic performance of the arm.

The exterior end of the connecting part is situated substantially below the plane of the upper wall 34‴ of the terminal part 28‴. Here this exterior end portion has a substantially L-shaped general shape.

The walls 32a‴, 32b‴ of the terminal part 28‴ each comprise a lateral notch 38‴ at the level of their longitudinal lower edges, those notches being visible in FIG. 6 and concealed by the connecting part 30‴ in FIG. 7. They are configured to cooperate by elastic clipping with engagement portions 27′ of flexible lugs of the adapter 26′. The cooperation of the engagement portions 27′ with the notches 38‴ provides a securing function that establishes a durable connection of the wiper to the arm. Alternatively, the notches could be replaced by simple edges cooperating with, for example bearing on, the engagement portions 27′ of the flexible lugs. These notches 38‴ are substantially longitudinally offset toward the interior of the zone C, which explains why they are concealed by the connecting part 30‴ in FIG. 7. It is moreover seen in FIG. 7 that the articulation axis Y is situated substantially in line with the zone C.

The upper wall 34‴ of the terminal part 28‴ comprises at its exterior end a finger or hook 50 intended to cooperate by engagement with a housing 51 of the adapter 26′ (FIGS. 7 and 8).

Here the connecting part 30‴ and the terminal part 28‴ are formed in one piece, for example by pressing and welding plates.

The wiper 12 can be mounted on the arm 14‴ in the following manner. The terminal part 28‴ is disposed on the adapter 26′ of the system for connection to the wiper 12 and is inclined relative to that adapter so that the exterior longitudinal end 28b‴ of the terminal part 28‴ is closest to the adapter and cooperates first with the adapter. The hook 50 is engaged in a housing 51 of the adapter 26′. The interior longitudinal end 28b‴ of the terminal part 28‴ is then bent over the adapter to complete the connection and to lead to the engagement of the engagement portions 27′ with the notches 38‴, by elastic clipping. The engagement portions are for example situated at the end of a flexible lug.

Alternatively, the wiper 12 may be mounted by movement in longitudinal translation of the adapter in the terminal part 28‴ of the arm, from the outside toward the inside.

The invention is not limited to the examples described.

The yoke according to the invention is not limited to one particular method of manufacture and is for example formed by pressing, welding plates or by moulding, metal or thermoplastic.

The invention claimed is:

1. A yoke for drive arm of a wiper of a motor vehicle, said yoke comprising:
    a connecting part of elongate shape and including an interior longitudinal end configured to be connected to a drive means of the arm and an exterior longitudinal end; and
    a terminal part of elongate shape and including an exterior longitudinal end and an interior longitudinal end that is situated on a side of said drive means,
    wherein the exterior longitudinal end of said connecting part is connected to said connecting part in a zone that is longitudinally spaced from said interior longitudinal end of the terminal part,
    wherein the terminal part extends along an axis A, and the connecting part extends along an axis B substantially parallel to the axis A and at a distance from axis A,
    wherein the connecting part and the terminal part are integrally formed in one piece,
    wherein the terminal part is substantially U-shaped in cross-section and comprises two longitudinal lateral walls connected to one another by a transverse upper wall, and
    wherein the exterior longitudinal end of said connecting part is directly connected to one of the longitudinal lateral walls of the terminal part.

2. The yoke according to claim 1, wherein said zone is substantially at a middle, on an exterior half, on an exterior quarter or at the exterior end of the terminal part with reference to the longitudinal direction of the terminal part.

3. The yoke according to claim 1, wherein longitudinal upper edges of the two longitudinal lateral walls are interconnected by the transverse upper wall, said zone being situated on one of said longitudinal lateral walls.

4. The yoke according to claim 3, wherein said longitudinal lateral walls define between them a housing configured to receive at least a part of a system for connection of the arm to said wiper.

5. The yoke according to claim 4, wherein said housing opens longitudinally onto the interior longitudinal end or the exterior longitudinal end of the terminal part.

6. The yoke according to claim 3, wherein said connecting part comprises an exterior end portion connected to said terminal part and wherein the exterior end portion is situated substantially below a plane in which said upper wall of the terminal part extends.

7. The yoke according to claim 6, wherein said exterior end portion has a curved shape or an L-shape.

8. The yoke according to claim 1, wherein said terminal part comprises at least one orifice configured to receive, for example by elastic clipping, a pushbutton of a system for connection of the arm to said wiper, said at least one orifice being situated substantially in line with said zone or being longitudinally offset toward the interior of said zone.

9. The yoke according to claim 1, wherein said terminal part comprises at least one lateral edge or notch configured to receive, by elastic clipping, or to cooperate with an engagement portion of a system for connection of the arm to said wiper.

10. The yoke according to claim 1, wherein said terminal part comprises at least one exterior hook or finger configured to be engaged in a housing of a system for connection of the arm to said wiper.

11. An arm including the yoke according to claim 1.

12. An assembly comprising:
the arm according to claim 11; and
a system for connection of said arm to a windscreen wiper, comprising two members articulated to each other about an articulation axis, wherein said articulation axis is situated substantially in line with said zone or is longitudinally offset toward the interior of said zone.

13. A windscreen wiper system for a motor vehicle, comprising:
a wiper; and
the arm according to claim 11.

14. The yoke according to claim 1, wherein an innermost portion of a connection between the connecting part and the terminal part in a longitudinal direction is closer to the exterior longitudinal end of the terminal part than the interior longitudinal end of the terminal part.

15. The yoke according to claim 1,
wherein the connecting part comprises:
a first portion that is substantially straight and is substantially parallel to a longitudinal direction of the terminal part, and
a second portion that is curved from the first portion towards the terminal part, and
wherein a terminal end of the second portion is directly connected to the terminal part.

16. A wiper arm of a motor vehicle comprising:
a single wiper arm rod; and
a yoke for connecting the single wiper arm rod to a wiper, said yoke comprising:
a connecting part of elongate shape and including an interior longitudinal end configured to be connected to a drive means of the arm and an exterior longitudinal end, and
a terminal part of elongate shape and including an exterior longitudinal end and an interior longitudinal end that is situated on a side of said drive means,
wherein the exterior longitudinal end of said connecting part is connected to said connecting part in a zone that is longitudinally spaced from said interior longitudinal end of the terminal part,
wherein the terminal part extends along an axis A, and the connecting part extends along an axis B substantially parallel to the axis A and at a distance from axis A,
wherein the connecting part and the terminal part are integrally formed in one piece,
wherein the terminal part is substantially U-shaped in cross-section and comprises two longitudinal lateral walls connected to one another by a transverse upper wall, and
wherein the exterior longitudinal end of said connecting part is directly connected to one of the longitudinal lateral walls of the terminal part.

* * * * *